United States Patent [19]

Scarrott

[11] 4,389,682

[45] Jun. 21, 1983

[54] MAGNETIC RECORDING SYSTEMS

[75] Inventor: Gordon G. Scarrott, Welwyn Garden City, England

[73] Assignee: International Computers Limited, London, England

[21] Appl. No.: 180,614

[22] Filed: Aug. 25, 1980

[30] Foreign Application Priority Data

Aug. 31, 1979 [GB] United Kingdom ............... 7930355

[51] Int. Cl.³ .......................... G11B 5/09; G11B 5/02
[52] U.S. Cl. ....................................... 360/45; 360/29; 360/46
[58] Field of Search .................. 360/45, 41, 46, 67, 360/29, 30, 375

[56] References Cited

U.S. PATENT DOCUMENTS 3,775,759 11/1973 Armitage, Jr. et al. .............. 360/45
3,899,666 8/1975 Bolger ................................. 375/11
4,081,756 3/1978 Price et al. ........................... 360/45

Primary Examiner—Vincent P. Canney
Attorney, Agent, or Firm—Lee, Smith & Jager

[57] ABSTRACT

A digital magnetic recording system in which information is recorded as transitions between regions magnetized in opposite senses. In the read channel the output of the read head is applied to modulate a carrier, passed through a surface acoustic wave transversal filter and then demodulated, and the resulting transformed waveform is sampled. The surface acoustic wave transversal filter is designed to control the manner in which the transformed versions of elementary read pulses interfere at the sampling instants in such a way as to facilitate recovery of the recorded bits.

8 Claims, 4 Drawing Figures

MAGNETIC RECORDING SYSTEMS

BACKGROUND OF THE INVENTION

This invention relates to digital magnetic recording systems, especially for high density recording, such as is used for example with magnetic-disc devices.

The magnetic recording process can be divided into two parts, which in a digital context are usually called the write process and the read process. In high-density digital recording the write process normally records the digital information as a sequence of transitions between regions of a magnetic medium that are approximately fully magnetised in opposite senses. This process exploits the non-linear recording properties of the medium and allows transitions to be written very close together. There are no corresponding non linearities in the read process, so the read pulses resulting from neighbouring transitions will, as the transitions are brought closer together, overlap and superpose. This process, which will be referred to herein as "interference," makes it difficult to distinguish the individual pulses and recover the recorded information. It is therefore possible to write transitions closer together than they can be resolved by the read process.

The read process is therefore the factor which limits the density with which information can be recorded. If it could be improved the storage capacity of the medium and the rate at which data can be read out could be increased.

SUMMARY OF THE INVENTION

This invention provide a digital magnetic recording system the read channel of which includes a read head and a surface acoustic wave transversal filter the characteristics of which are such as to transform, or assist in transforming, the read waveform into a waveform from which the recovery of the recorded information is facilitated.

The invention provides apparatus for reproducing digital information recorded on a magnetic medium as transitions between regions of the medium magnetised in opposite senses, the apparatus comprising:

a read head for outputting a read waveform on relative movement between the magnetic medium and the read head, the read waveform being composed of read pulses each resulting from the relative movement of a single one of the said transitions past the read head, and read pulses being subject to interference with one another;

means for transforming the read waveform into a transformed waveform, which means comprise in sequence a modulator arranged to modulate a carrier wave in accordance with an input derived from the output of the read head, a surface acoustic wave transversal filter and a demodulator arranged to remove the said carrier wave; and means for extracting from the transformed waveform a digital signal dependent on the recorded information; the characteristics of the surface acoustic wave transversal filter being chosen, in conjunction with those of the remainder of the transforming means, in such a way as to facilitate the extraction of the said digital signal by controlling the manner in which, or at least reducing the extent to which, the transformed versions of the read pulses interfere with one another in the transformed waveform.

The invention further provides a method of reading digital information recorded on a magnetic medium as transitions between regions of the medium magnetised in opposite senses, the method comprising:

causing relative movement between the magnetic medium and a read head, the read head being thereby caused to output a read waveform composed of read pulses each resulting from the relative movement of a single one of the said transitions past the read head, read pulses being subject to interference with one another;

transforming the read waveform into a transformed waveform by means which comprise in sequence a modulator in which a carrier wave is modulated in accordance with an input derived from the output of the read head, a surface acoustic wave transversal filter and a demodulator in which the said carrier wave is removed;

and extracting from the transformed waveform a digital signal dependent on the recorded information;

the characteristics of the surface acoustic wave transversal filter being chosen, in conjunction with those of the remainder of the transforming means, in such a way as to facilitate the extraction of the said digital signal by controlling the manner in which, or at least reducing the extent to which, the transformed versions of the read pulses interfere with one another in the transformed waveform.

The use of a surface acoustic wave transversal filter in accordance with the invention makes it possible to increase the density with which information can be recorded as compared with the case in which the information is recovered from the untransformed read waveform.

BRIEF DESCRIPTION OF THE DRAWINGS

A digital magnetic recording system constructed and operating in accordance with the invention will now be described by way of example in greater detail with reference to the accompanying drawings, in which.

DESCRIPTION OF THE PREFERRED EMBODIMENTS

Figure 1:
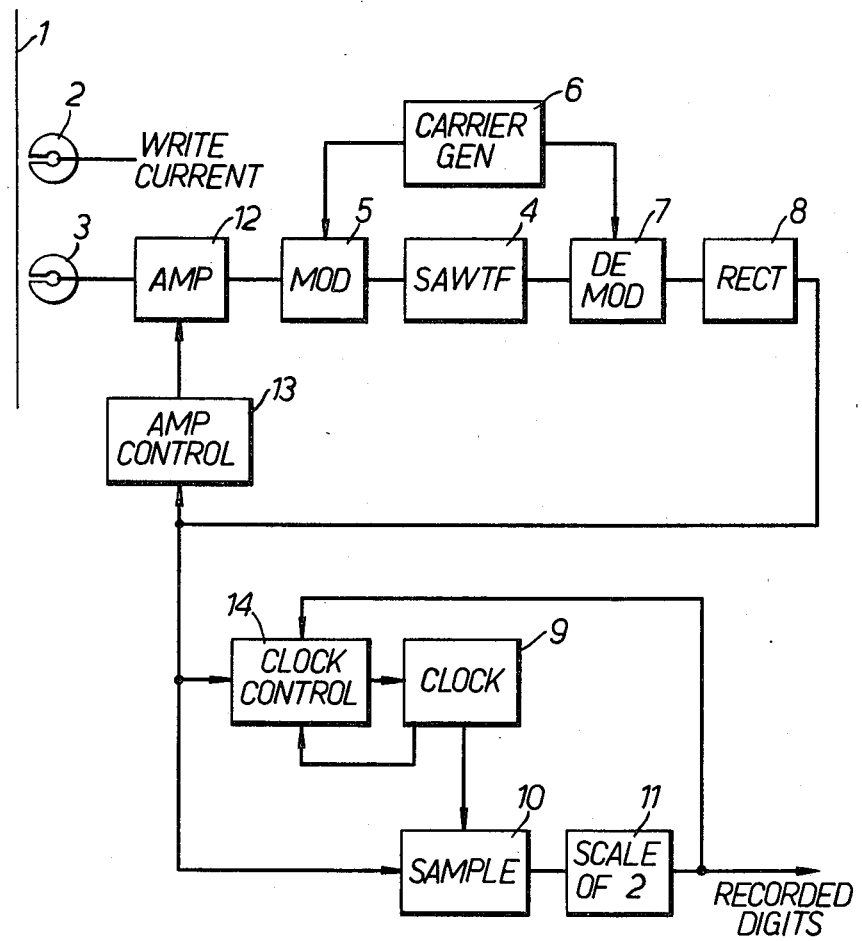
FIG. 1 is a block diagram of the system.

Referring to FIG. 1, the system writes and reads digital data on a magnetic medium 1. The medium may, for example, be a magnetic disc, although the technique to be described may equally well be used in other high-density digital recording applications.

The information to be recorded is supplied as a write current to a write head 2 past which the medium in operation moves. The write current switches between a positive and a negative value (see also the waveform of FIG. 2a). While the current is steady at one of these values it magnetises the medium to saturation in one direction; after it has switched to the other value it magnetises the medium in the opposite direction; and between the two regions magnetised in opposite directions is a very thin transition region which coincides with the instant of switching.

Figure 2:
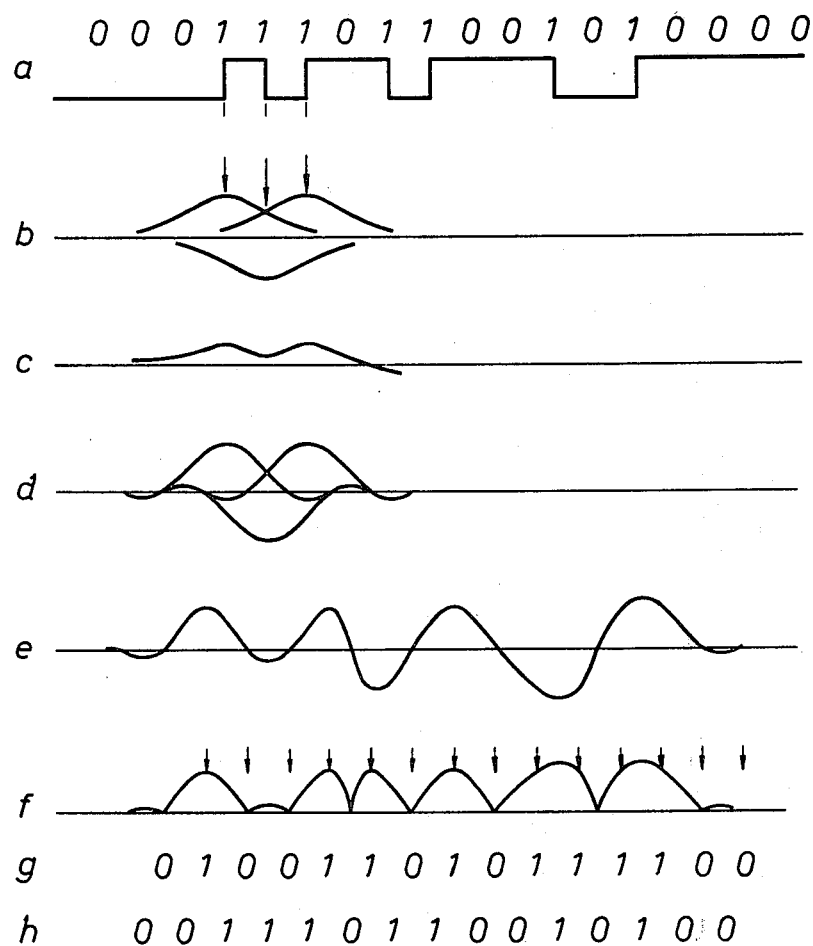
FIG. 2a through h show waveforms arising at various points in the system.

The instants at which switching is allowed to take place occur at equally spaced intervals. The transitions, therefore, can occur only at possible positions which are equally spaced on the medium. In FIG. 2a they have been interpreted as representing a string of bits each of which occurs at one of the possible positions and using a non-return to zero encoding in which a one is represented by a transition at a possible position and a zero by the absence of a transition at a possible position. This is the most compact representation assuming that the positions at which transitions can occur are spaced as closely as the system allows. The bit sequence recorded may itself be an encoding of the original data.

The information recorded on the medium 1 is read by a read head 3. The read head is shown as separate from the write head 2, because that allows the two heads to be optimised independently, but a combined read-write head can be used if desired.

During a read operation the magnetic medium 1 moves past the read head 3, and flux changes sensed by the head induce a voltage in the windings of the head. Flux changes are only experienced in the neighbourhood of the transitions, and an individual transition gives rise to a bell-shaped read pulse such as one of the pulses of FIG. 2b. As the read process is effectively linear, the pulses from different transitions may be summed to give the complete read waveform, as shown in FIG. 2c.

It will be seen that the pulses from adjacent transitions interfere. Since the transitions alternate in sense, the individual read pulses alternate in sign, and the interference between pulses depresses and shifts the peaks of the waveform. If the transitions on the medium are brought closer these effects become more pronounced and eventually it is no longer possible reliably to distinguish the original pulses and recover the recorded information. At this point the limit has been reached on how closely the bits may be recorded on the medium 1.

In accordance with the invention the read waveform is transformed into a waveform from which the recorded information may be recovered more easily. This transformation is carried out principally by a surface acoustic wave transversal filter 4. The filter 4 operates not on the read waveform itself, but on that waveform modulated by an amplitude modulator 5 onto a high-frequency carrier wave from a source 6. The signal output by the surface acoustic wave transversal filter 4 is then demodulated by a coherent demodulator 7 to remove the carrier.

Surface acoustic wave transversal filters are described in, for example "Acoustic Surface Wave Filters" by R. H. Trancrell and M. G. Holland in Proceedings of the IEEE, March 1971, pages 393 to 409. In such a filter an acoustic wave is launched onto the surface of a piezo-electric crystal by a transducer consisting of a pair of interdigitated metallic combs. The wave is then received by another such transducer. It is an example of a transversal filter, which is one in which the input waveform is passed through a tapped delay line and the output waveform is the weighted sum of the outputs of the taps. By choosing the delays of the taps and their weighting any required frequency response can be achieved to a desired accuracy free (at the expense of a delay) from the restriction to which conventional filters are subject that the phase and amplitude of the output cannot be tailored independently. The techniques for designing a surface acoustic wave transversal filter to have a desired response are described in greater detail in, for example, Part 3 of "Surface acoustic filters, design, construction, and use," edited by John Matthews and published by John Wiley and Sons in 1977. The principal tool in tailoring the response is the adjustment of the spacing and degree of overlap of the teeth of the transducer combs.

In this case the surface acoustic wave transversal filter is designed to transform the measured shape of a single read pulse 32, modulated onto the carrier 31, as shown in FIG. 3a, into a pulse as shown in FIG. 3b. The envelope 34 of the transformed pulse is of the Nyquist 2 form. That is, perhaps, most helpfully explained by reference to the Nyquist 1 form, which is shown in FIG. 4a. A Nyquist 1 waveforms is 1 at a time t=0 and $0 = \pm nT$, where n is an integer greater than 0. The curve shown as an example has the equation $y = (\sin x)/x$ where x is $t/T$. The Nyquist 2 form is obtained by adding together two Nyquist 1 waveforms the peaks of which are spaced apart by T, as shown in FIG. 4b. The resultant, as shown in FIG. 4, has the value 1 at 0 and T and is 0 at $-T$ and $\pm nT$, where n is an integer greater than 1.

Figure 3:
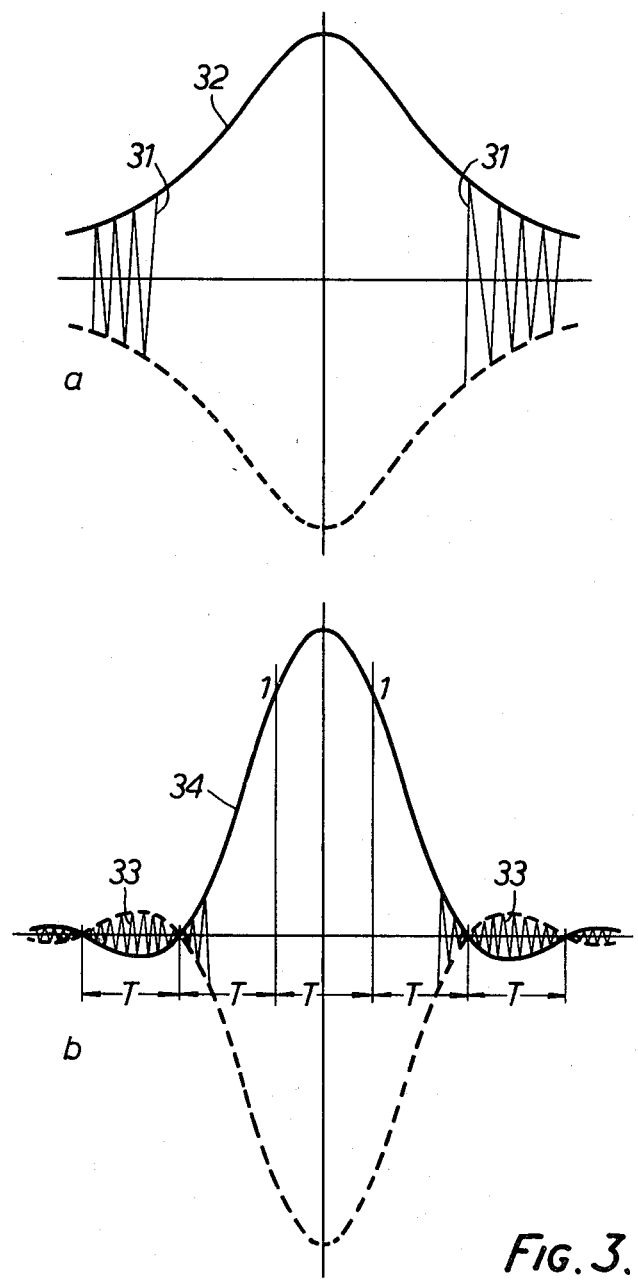
FIG. 3 shows waveforms in more detail.
Figure 4:
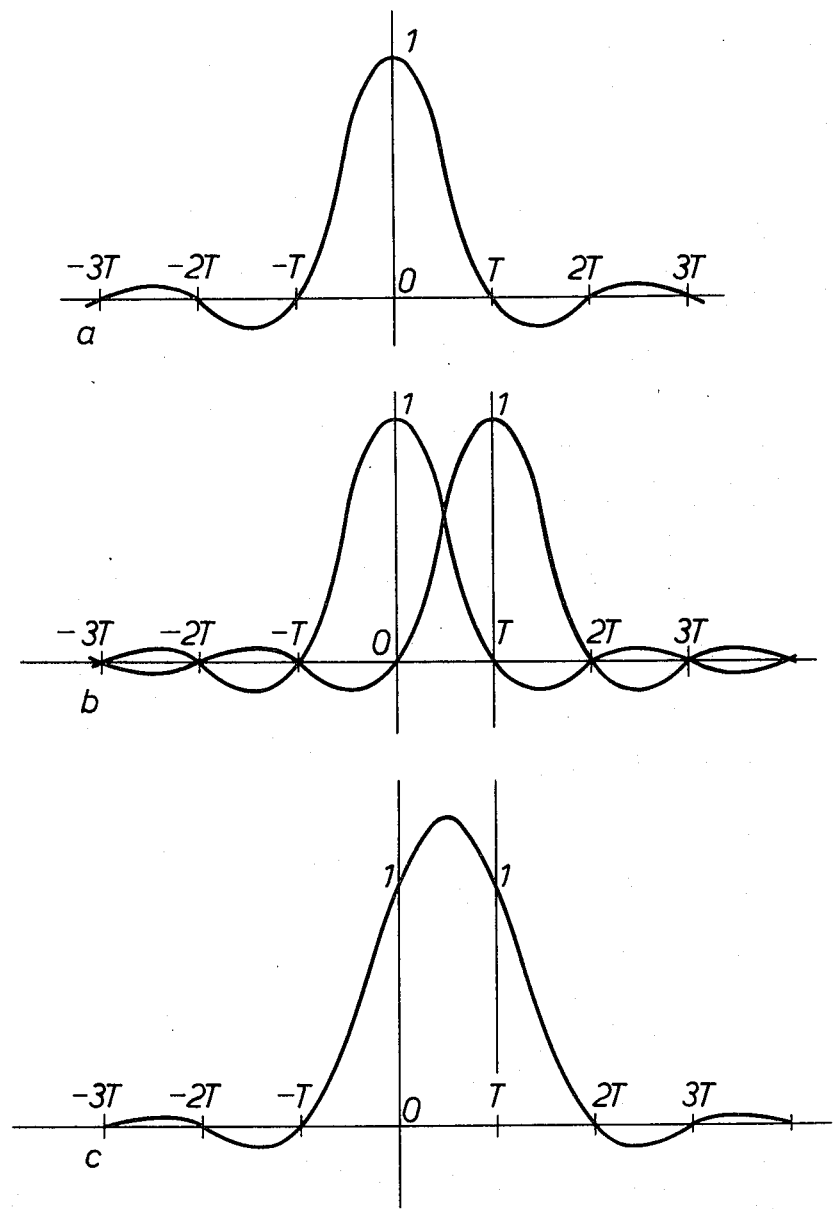
FIG. 4 illustrates how the transformed waveform of FIG. 3 is derived.

Returning to FIG. 3, the envelope of the waveform output by the surface acoustic wave transversal filter, as shown in FIG. 3b has the Nyquist 2 form. It is, of course, delayed by the filter, but for convenience its peak is shown aligned with that of the read pulse, with the result that the waveform has a predetermined value equivalent to 1 at $\pm \frac{1}{2}T$, and is 0 at $\pm(n+\frac{1}{2})T$, where n is an integer greater than 0. The period T is chosen to be the interval between the passage past the read head 2 of two successive positions at which transition can occur.

A waveform corresponding to the envelope of the output of the surface acoustic wave transversal filter is produced by the demodulator 7. FIG. 2d shows the transformed versions of three read pulses (advanced, once again, so that they are aligned with the read pulses from which they are derived). Because the read process is (at any rate to a first approximation) linear, the superposition theorum applies and the total waveform is, as shown in FIG. 2e, the sum of the individual transformed pulses each derived by considering the effect of the filter 7 on a single read pulse.

The demodulated waveform as shown in FIG. 2e is rectified by a rectifier 8 into what may be regarded as the final transformed waveform, as shown in FIG. 2f. (In practice the demodulator may carry out the rectification.) The transformed waveform is subjected to a recovery process by which the original recorded digital signal is recovered. In this process the waveform as shown in FIG. 2f is strobed at intervals equal to those at which the positions at which transitions can occur pass the read head 3, but displaced from the peak of an isolated read pulse in the final transformed waveform by half a period. At these times this waveform has the value 0 or 1. The reason for this fact is that only two possible transitions can contribute to the waveform at the strobe time, the ones (if present) having a peak half a period before or after the strobe time. All other transformed read pulses are null at the strobe time. If one only of the two possible transitions is present the amplitude of the waveform is 1. If both are present it is 0, since the two pulses are of opposite sign.

The final transformed waveform is strobed by a signal from a clock 9 applied to a sampling circuit 10 receiving the output of the rectifier 8. That produces the digital signal shown in FIG. 2g, which is applied to a scale-of-2 circuit 11. The circuit 11 recovers the original recorded digital information shown in FIG. 2a by changing its output when it receives a 1 and leaving it unchanged when it receives a 0. The effect of this operation is to remove the contribution of the pulse whose peak immediately precedes the strobe time on the occasions when that pulse is present. The output of the circuit 11 is shown in FIG. 2b (where it is delayed by half a period to restore alignment on the diagram with the original recorded information). It reproduces that recorded information and is the output from the read channel.

The read signal is amplified by an amplifier 12 before being supplied to the modulator 5 for the surface acoustic wave transversal filter. In order to keep the amplitudes of the individual transformed read pulses at the sampling times equal to the value expected, the gain of the amplifier 12 is controllable, and a control circuit 13 monitors the waveform from the rectifier 8 and detects isolated peaks, which are compared with a reference to give rise to a signal changing the gain of the amplifier 12 if necessary in order to keep the amplitude of a transformed read pulse equal to a reference value (treated as "1" in the previous discussion) at the sampling times.

The clock 9 is a controllable oscillator. It is controlled by a circuit 14 which compares the output of the clock 9 with the recorded information in order to keep the two in synchronism. The circuit 14 monitors the peaks of the waveform to direct those which are symmetrical, that is, those which are not shifted by interference. Their timing is compared with the clock output (displaced by half a period to coincide with the expected peak) and a signal issued to change the frequency or phase of the clock if the peak occurs earlier or later than expected.

The recorded signal may contain redundant information to ensure that the longest possible period between synchronising pulses does not exceed a desired value. That also allows error detection and the elimination of a d c component in the write current resulting from unequal totals of ones and zeros.

Instead of the filter giving Nyquist 2 transformed read pulse as described, it may be a pulse of another shape, for example Nyquist 1. In that case detection of the recorded digits consists simply in sampling the amplitude of the final transformed waveform at the time of the expected peaks. This form, however, has a less favourable signal-to-noise ratio.

In the system described the bit string recorded is output from the scale-of-two circuit 11. As an alternative, the information to be recorded may be precoded by being input to a scale-of-two circuit from the output of which the write current is derived. In this case the scale-of-two circuit 11 is not used and the output of the sampling circuit 10 is itself the desired information. (For example the bit string of 2g, when put through a scale-of-two circuit, gives the bit string of FIG. 2a, and if precoded in this way and then recorded is recovered directly from the sampling circuit 10.)

The transformation to be performed may, if desired, be carried out in stages by more than one surface-acoustic wave transversal filter.

As an example of a suitable ratio the carrier frequency may be ten times the data rate, which for a data rate of 5 to 10 million bits per second implies a frequency of 50 to 100 megahertz.

It will be recognised by the man skilled in the art that the components of the system described herein which process the signal supplied to the surface acoustic wave transversal filter 4 and output from it are all either standard units or are readily constructed using conventional electronic circuitry to perform the function described. They are therefore not described in more detail.

The filter according to the invention improves the signal to noise ratio of the read process, and therefore its ability to resolve the recorded bits, allowing them to be recorded more closely. Even assuming that imperfections cause departures from the ideal system described above it may be expected that it will allow the storage capacity and data rate of a current magnetic disc storage device to be increased by a factor of 1.5 to 2.

Transversal filters have been implemented by forms of shift register such as the bucket-brigade transversal filter. That however necessitates a strobing waveform synchronised with the information signals, and this poses a difficult synchronism problem since the input to such a filter is ill-suited to the provision of precise timing signals. The carrier frequency of the surface acoustic wave transversal filter, however, can be regarded as a strobe of so high a frequency as to avoid the need for synchronisation.

I claim:

1. Apparatus for reproducing digital information recorded on a magnetic medium as transitions between regions of the medium magnetised in opposite senses, the apparatus comprising:

a read head for outputting a read waveform on relative movement between the magnetic medium and the read head, the read waveform being composed of read pulses each resulting from the relative movement of a single one of the said transitions past the read head, and read pulses being subject to interference with one another;

means for transforming the read waveform into a transformed waveform, which means comprise in sequence a modulator arranged to modulate a carrier wave in accordance with an input derived from the output of the read head, surface acoustic wave transversal filter means and a demodulator arranged to remove the said carrier wave; and means for extracting from the transformed waveform a digital signal dependent on the recorded information;

the response of the surface acoustic wave transversal filter means being such as to facilitate the extraction of the said digital signal by controlling the manner in which, or at least reducing the extent to which, the transformed versions of the read pulses interfere with one another.

2. Apparatus as claimed in claim 1, in which the transistions on the recorded medium are arranged in operation to occur at selected ones of a plurality of evenly spaced positions on the medium and the extracting means includes sampling means for sampling the amplitude of the transformed waveform at a plurality of sampling times, the characteristics of the transformation of the read waveform into the transformed waveform being such that an isolated read pulse is transformed into a pulse the amplitude of which, as sampled at each sampling time, is substantially zero or bears a substantially predetermined relation to a reference value.

3. Apparatus as claimed in claim 2, in which the sampling means is arranged to carry out the sampling at the same rate that the positions on the medium at which transitions can occur in operation pass relative to the read head.

4. Apparatus as claimed in claim 1, in which the transforming means output a rectified waveform.

5. A method of reading digital information recorded on a magnetic medium as transitions between regions of the medium magnetised in opposite senses, the method comprising:

causing relative movement between the magnetic medium and a read head, the read head being thereby caused to output a read waveform composed of read pulses each resulting from the relative movement of a single one of the said transitions past the read head, read pulses being subject to interference with one another;

transforming the read waveform into a transformed waveform by means which comprise in sequence a modulator in which a carrier wave is modulated in accordance with an input derived from the output of the read head, surface acoustic wave transversal filter means and a demodulator in which the said carrier wave is removed;

and extracting from the transformed waveform a digital signal dependent on the recorded information;

the response of the surface acoustic wave transversal filter being such as to facilitate the extraction of the said digital signal by controlling the manner in which or at least reducing the extent to which, the transformed versions of the read pulses interfere with one another.

6. A method as claimed in claim 5, in which the said transitions on the magnetic medium occur at selected ones of a plurality of evenly spaced positions on the medium and the extraction step includes sampling the amplitude of the transformed waveform at a plurality of sampling times, the characteristics of the transformation of the read waveform into the transformed waveform being such that an isolated read pulse is transformed into a pulse the amplitude of which, as sampled at each sampling time, is substantially zero or bears a substantially predetermined relation to a reference value.

7. A method as claimed in claim 6, in which the sampling is carried out at the same rate as the positions on the magnetic medium at which transitions can occur pass relative to the head.

8. A method as claimed in claim 5, in which the transforming step produces a rectified waveform.

* * * * *